United States Patent
Rajendra et al.

(10) Patent No.: US 9,698,561 B1
(45) Date of Patent: Jul. 4, 2017

(54) TEMPERATURE TUNED CONJUGATED POLYMER LASER

(71) Applicant: KING SAUD UNIVERSITY, Riyadh (SA)

(72) Inventors: Saradh Prasad Rajendra, Chengalpattu (IN); Mohamad Saleh Alsalhi, Riyadh (SA); Vadivel Masilamani, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/397,667

(22) Filed: Jan. 3, 2017

(51) Int. Cl.
*H01S 3/10* (2006.01)
*H01S 3/213* (2006.01)
*H01S 3/131* (2006.01)
*C08L 65/00* (2006.01)

(52) U.S. Cl.
CPC ............. *H01S 3/213* (2013.01); *C08L 65/00* (2013.01); *H01S 3/1317* (2013.01); *C08L 2203/20* (2013.01)

(58) Field of Classification Search
CPC .............................. H01S 3/1317; C08L 65/00
USPC ............................................ 372/20; 257/40
See application file for complete search history.

(56) References Cited

U.S. PATENT DOCUMENTS

| | | | |
|---|---|---|---|
| 6,665,479 B2 | 12/2003 | Gharavi | |
| 9,310,630 B2 | 4/2016 | Arsenault et al. | |
| 9,365,679 B2 | 6/2016 | Zhou et al. | |
| 2012/0056249 A1* | 3/2012 | Mueller | C08F 232/00 257/288 |
| 2014/0270618 A1 | 9/2014 | Dinu et al. | |
| 2015/0333263 A1* | 11/2015 | D'Lavari | C08G 61/126 252/500 |
| 2015/0340616 A1* | 11/2015 | Blouin | C08K 3/04 252/500 |

OTHER PUBLICATIONS

Scherf, Ullrich, et al. "Conjugated polymers: lasing and stimulated emission." Current Opinion in Solid State and Materials Science 5.2 (2001): 143-154.
Pisignano, Dario, et al. "Amplified spontaneous emission and efficient tunable laser emission from a substituted thiophene-based oligomer." Applied Physics Letters 81.19 (2002): 3534-3536.
Prasad et al., "Design of a Tunable Broadband Conjugated-Polymer Laser in Solution", IACSIAT International Journal of Engineering and Technology, vol. 6, No. 4 (2014).

* cited by examiner

*Primary Examiner* — Tuan Nguyen
(74) *Attorney, Agent, or Firm* — Richard C. Litman

(57) ABSTRACT

The temperature tuned conjugated polymer laser uses a thiophene-based conjugated polymer as the laser medium to produce an output laser beam having a wavelength tunable between approximately 552 nm and approximately 612 nm over a temperature range of the thiophene-based conjugated polymer between approximately 60° C. and approximately 10° C., with an overall tunability of about 1.2 nm/° C. The thiophene-based conjugated polymer laser medium is a solution of poly[3-(2-ethyl-isocyanato-octadecanyl)-thiophene] dissolved in tetrahydrofuran (THF). A temperature controller selectively and controllably adjusts the temperature of the thiophene-based conjugated polymer to selectively and controllably tune the wavelength of the output laser beam.

5 Claims, 5 Drawing Sheets

TEMPERATURE TUNED CONJUGATED POLYMER LASER

BACKGROUND OF THE INVENTION

1. Field of the Invention

The present invention relates to tunable lasers, and particularly to a temperature tuned conjugated polymer laser that uses a thiophene-based conjugated polymer as the laser medium.

2. Description of the Related Art

There is a great deal of interest in optically-pumped tunable lasers, since such lasers have a very broad range of applications, from industrial purposes to medical applications. However, optically pumped, tunable solid-state lasers, such as Ti:sapphire and forsterite lasers, although presently commercially available, are both expensive and have limited tunability. Presently, research is being directed towards dye lasers, which use such dyes as rhodamine and coumarin derivatives as a lasing medium, since such dye-based laser media have an excellent capacity for tunability. However, such dyes have, thus far, been found to have shortcomings related to their photochemical stability.

In order to find an alternative to such dyes as rhodamine and coumarin derivatives, conjugated polymers have been proposed as a potential new type of laser material, since conjugated polymers should exhibit better photochemical stability than conventional dye solutions. Conjugated polymers contain alternating C=C double bonds (typically one σ-bond and one π-bond) and C—C single bonds (σ-bonds). This alternation of single and double bonds determines the opening of the band gap due to the Peierls distortion and explains why conjugated polymers in their neutral state are semiconductors and not metals. As a result of the oscillation of the π-electrons, electromagnetic radiation is absorbed. The process is similar to what occurs during the photosynthesis process in plants. For example, a molecule with only one conjugated double bond will absorb only ultraviolet light. With additional conjugated double bonds, a molecule will be able to absorb different wavelengths of visible light. The π-electrons are therefore responsible for determining the electrical and chemical properties.

There are many types of conjugated polymer based on building block materials (i.e., monomers) such as polypyrrole, polyaniline, polythiophene and polyacetylene. One such polymer group is the polythiophenes, which possess unique electrical and optical properties, and which have been shown to have very good thermal stability and fluorescence properties. They have found application in many fields, such as OLEDs, solar cells, and biosensors. Thus, a temperature tuned conjugated polymer laser solving the aforementioned problems is desired.

SUMMARY OF THE INVENTION

The temperature tuned conjugated polymer laser uses a thiophene-based conjugated polymer as the laser medium to produce an output laser beam having a wavelength tunable between approximately 552 nm and approximately 612 nm over a temperature range of the thiophene-based conjugated polymer between approximately 60° C. and approximately 10° C., with an overall tunability of about 1.2 nm/° C. The thiophene-based conjugated polymer laser medium is a solution of poly[3-(2-ethyl-isocyanato-octadecanyl)-thiophene] dissolved in tetrahydrofuran (THF).

A pump laser generates an initial light beam, which is then focused by a lens into an excitation light beam. The thiophene-based conjugated polymer is circulated through an optical cell, and the excitation light beam is directed towards the optical cell to cause the thiophene-based conjugated polymer to lase.

The optical cell has an inlet port and an outlet port for respectively injecting and removing the thiophene-based conjugated polymer circulated through the optical cell. A temperature controller may be in direct contact with the optical cell for selectively and adjustably controlling the temperature of the thiophene-based conjugated polymer, or the temperature controller may be external to the optical cell for pre-heating or pre-cooling the thiophene-based conjugated polymer prior to injection into the optical cell.

An optical cavity is spaced apart from the optical cell for intensifying stimulated radiation emitted from the thiophene-based conjugated polymer. As in a conventional laser system, the optical cavity is formed from a fully-reflective mirror and a partially-reflective mirror arranged opposite one another around the laser medium, so that the output light beam exits the partially-reflective mirror. The selective and controllable adjustment of the temperature of the thiophene-based conjugated polymer is used to selectively and controllably tune the wavelength of the output light beam.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The temperature tuned conjugated polymer laser 10 uses a thiophene-based conjugated polymer as the laser medium to produce an output laser beam having a wavelength tunable between approximately 552 nm and approximately 612 nm over a temperature range of the thiophene-based conjugated polymer between approximately 60° C. and approximately 10° C., with an overall tunability of about 1.2 nm/° C. The thiophene-based conjugated polymer laser medium is a solution of poly[3-(2-ethyl-isocyanato-octadecanyl)-thiophene] dissolved in tetrahydrofuran (THF). The concentration of the poly[3-(2-ethyl-isocyanato-octadecanyl)-thiophene] in the solution is between approximately 0.25 mol/m³ and approximately 4.0 mol/m³.

Figure 1:
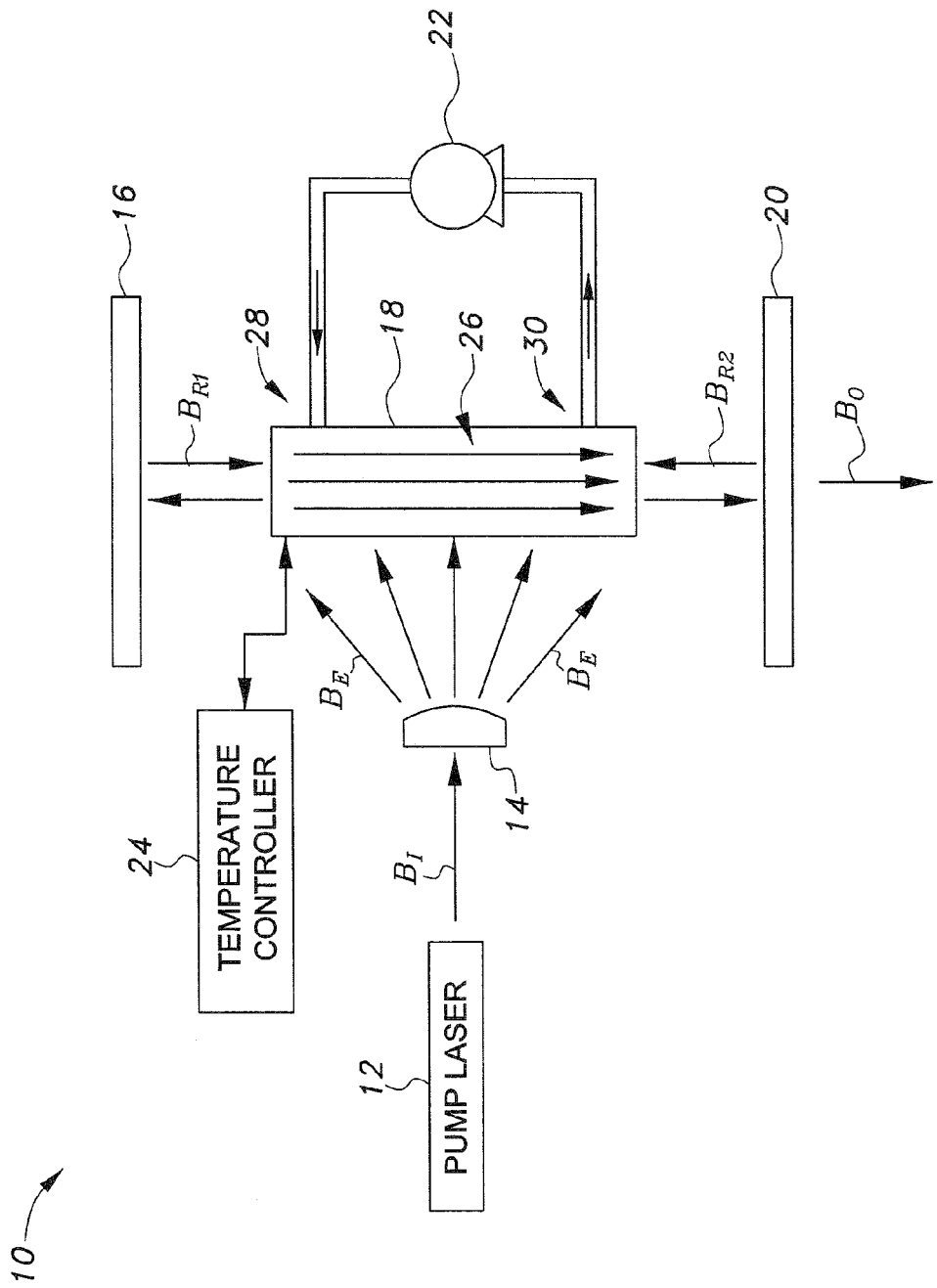
FIG. 1 is a schematic diagram of a temperature tuned conjugated polymer laser according to the present invention.

The thiophene-based conjugated polymer laser medium may be used in a conventional laser system. As shown in FIG. 1, the temperature tuned conjugated polymer laser 10 includes a pump laser 12 for generating an initial light beam $B_I$. For the tunable wavelengths given above, the initial light beam has a wavelength of approximately 355 nm. In the experiments detailed below, a Nd:YAG laser was used as the pump laser 12, producing an output beam having a wavelength of 355 nm delivered in 10 ns pulses at a pulse rate of 10 Hz. As is common in lasers using a coherent light beam as an initial excitation source, the initial light beam $B_I$ is focused by a lens 14 into an excitation light beam $B_E$. It should be understood that the lens 14 is shown for exemplary purposes only, and that any suitable type of intermediate optics may be utilized. In the experiments detailed below, a quartz plano-convex lens having a focal length of 50 mm was used to focus the laser pulse $B_I$ to transversely excite the solution.

The thiophene-based conjugated polymer is circulated through an optical cell 18, and the excitation light beam $B_E$ is directed towards the optical cell 18 to cause the thiophene-based conjugated polymer to lase. It should be understood that any suitable type of optical cell may be utilized. In the experiments detailed below, a conventional quartz cuvette was used as the optical cell 18. As shown, the optical cell 18 has an inlet port 28 and an outlet port 30 for respectively injecting and removing the thiophene-based conjugated polymer circulated through the optical cell 18 (indicated by arrows 26 in FIG. 1). Exemplary pump 22 is shown driving the thiophene-based conjugated polymer to circulate through the optical cell 18, although it should be understood that any suitable type of pump, circulator or the like may be used.

A temperature controller 24 may be in direct contact with the optical cell 18 for selectively and adjustably controlling the temperature of the thiophene-based conjugated polymer, or the temperature controller 24 may be external to the optical cell 18 for pre-heating or pre-cooling the thiophene-based conjugated polymer prior to injection into the optical cell 18. It should be understood that any suitable type of temperature controller may be used, such as a conventional heater, cooler, chiller, fan, Peltier device, thermoelectric cooler, heat pump or the like.

An optical cavity is spaced apart from the optical cell 18 for intensifying stimulated radiation emitted from the thiophene-based conjugated polymer (shown in FIG. 1 as reflected light beams $B_{R1}$ and $B_{R2}$). As in a conventional laser system, the optical cavity is formed by a fully-reflective mirror 16 and a partially-reflective mirror 20 arranged opposite one another around the laser medium, so that the output light beam $B_O$ exits the partially-reflective mirror 20. The selective and controllable adjustment of the temperature of the thiophene-based conjugated polymer by the temperature controller 24 is used to selectively and controllably tune the wavelength of the output light beam $B_O$. In the experiments detailed below, the optical resonator cavity used a 100% reflective mirror and a mirror with a 60% reflectivity.

Figure 2:
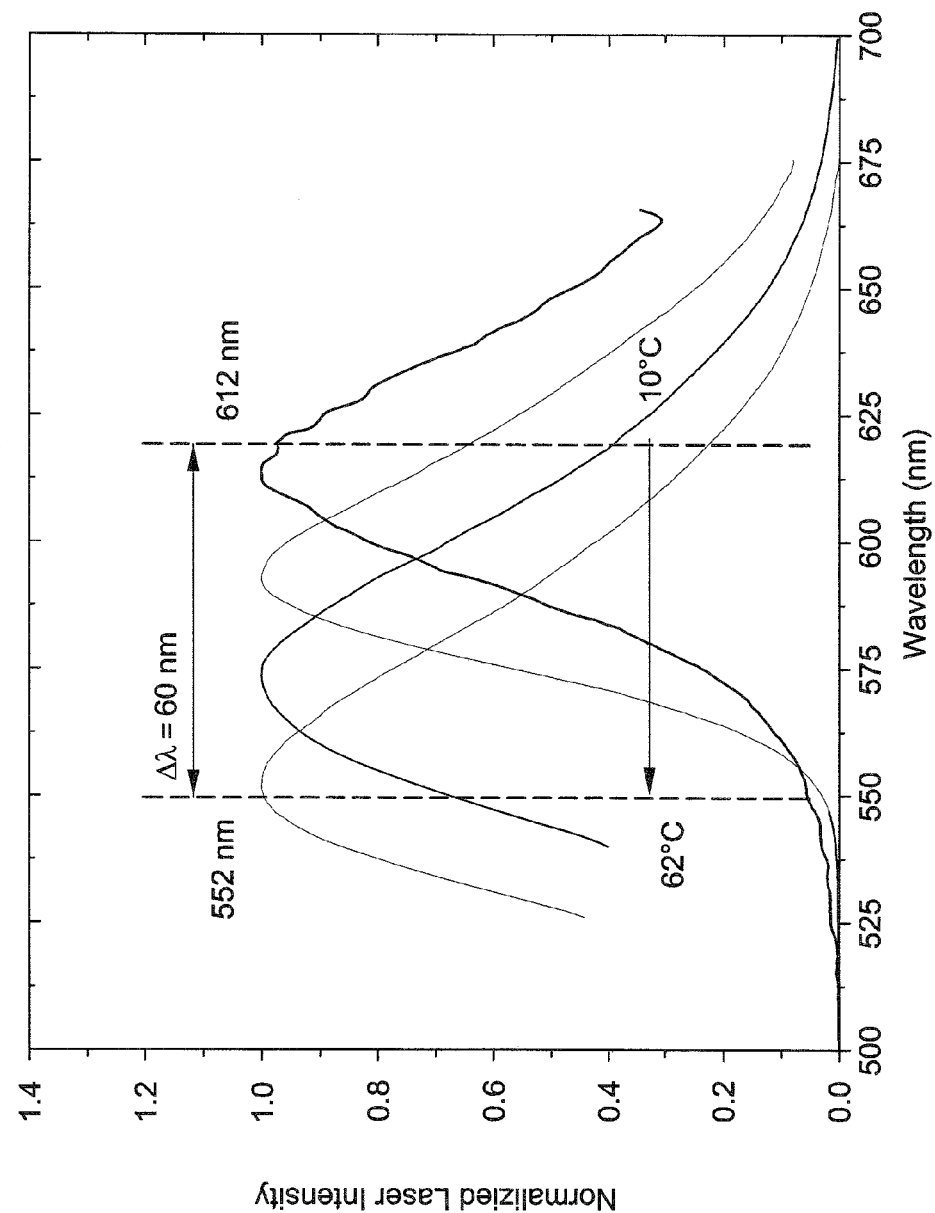
FIG. 2 is a graph showing the wavelength spectrum produced by the temperature tuned conjugated polymer laser at selected temperatures.

In the following experiments, the poly[3-(2-ethyl-isocyanato-octadecanyl)-thiophene] (TCP) was dissolved at 12 mg/mL in tetrahydrofuran (THF) and slightly warmed to dissolve completely. FIG. 2 shows the spectral properties of TCP at this concentration. The change in emission wavelength with respect to the temperature can be clearly shown, ranging between 552 nm and 612 nm over a temperature range of 62° C. to 10° C., thus yielding an incremental, or average, rate of change in the wavelength to temperature of 1.2 nm/° C.

Figure 3A:
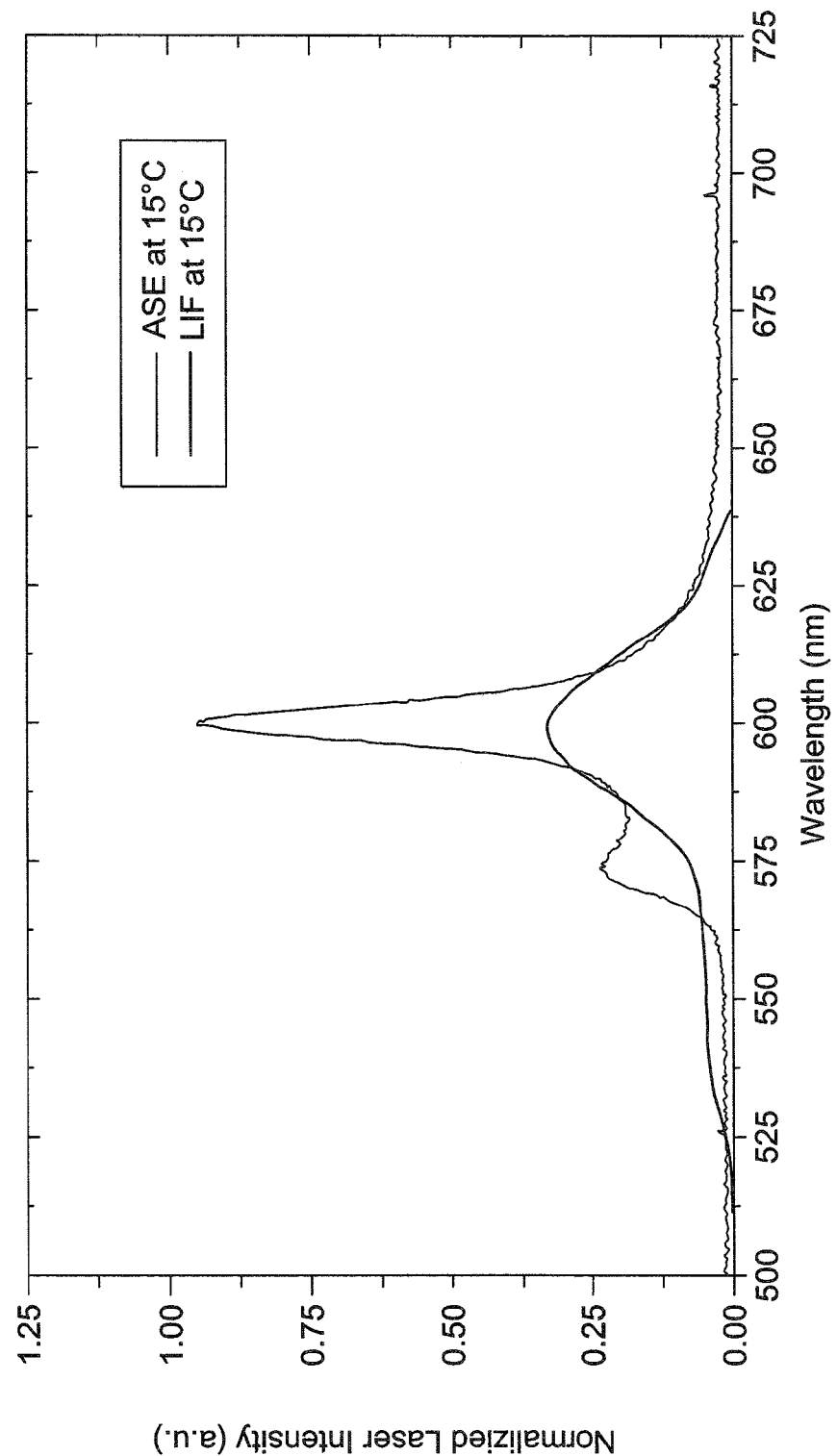
FIG. 3A is a graph showing the laser induced fluorescence (LIF) produced by the temperature tuned conjugated polymer laser pumped with a pump energy of 3 mJ, and the amplified spontaneous emission (ASE) laser spectra obtained with a pump energy of 10 mJ, both shown for a constant temperature of 15° C.
Figure 3B:
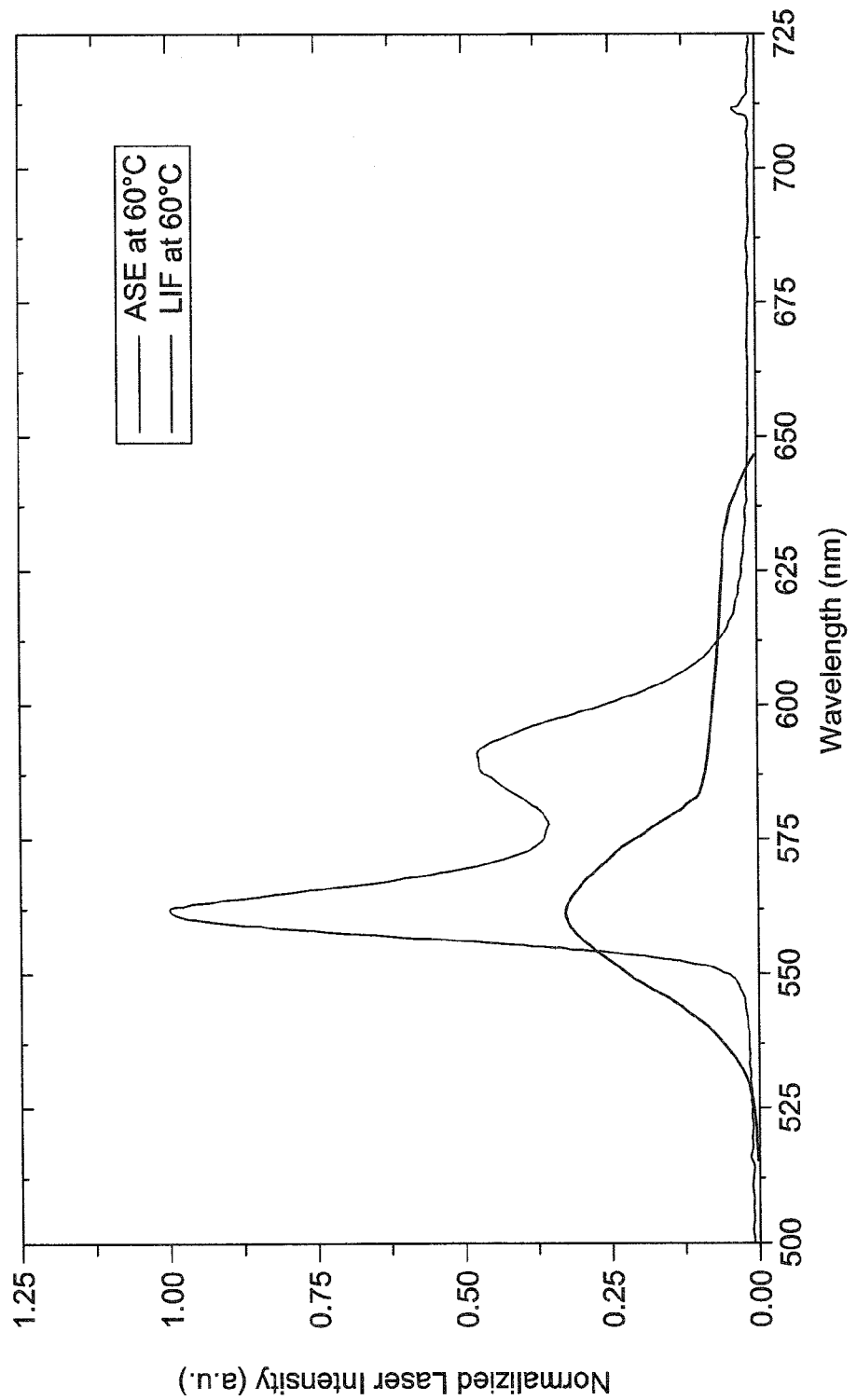
FIG. 3B is a graph showing the laser induced fluorescence (LIF) produced by the temperature tuned conjugated polymer laser pumped with a pump energy of 3 mJ, and the amplified spontaneous emission (ASE) laser spectra obtained with a pump energy of 10 mJ, both shown for a constant temperature of 60° C.

FIG. 3A shows the laser induced fluorescence (LIF) produced when the solution sample was pumped transversely with a pump energy of 3 mJ, along with the amplified spontaneous emission (ASE) laser spectra obtained with a pump energy of 10 mJ, both shown for a constant temperature of 15° C. Similarly FIG. 3B shows the LIF and ASE laser spectrum for the same operating conditions, but with a temperature held constant at 60° C. The laser emission here had a wavelength of 552 nm. In both cases, the laser spectral width was 2 nm.

Figure 4:
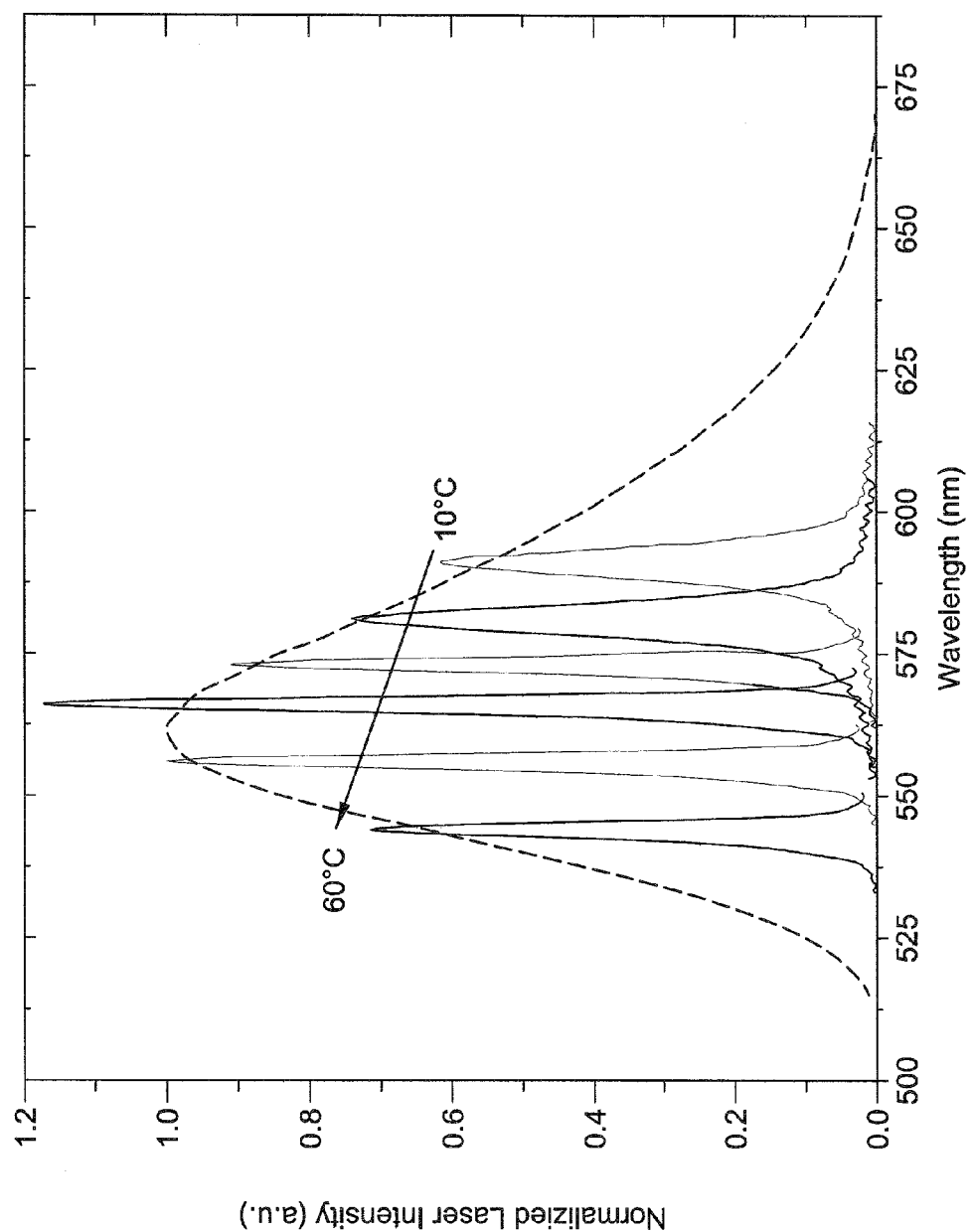
FIG. 4 is a graph showing the spectral output of the temperature tuned conjugated polymer laser for selected temperatures between 10° C. and 60° C.

Using the TCP concentration of 12 mg/mL in THF, with the Nd:YAG pump laser (355 nm, 10 ns, 10 Hz), the conversion efficiency of the temperature tuned conjugated polymer laser 10 was nominally 10%, having a power output of 1 mJ with a 5 ns pulse duration and a spectral width of 2 nm, giving rise to a photon flux of $6 \times 10^{29}$ photons/m (peak power). FIG. 4 shows the spectral output for a variety of temperatures between 10° C. and 60° C., and one can see the variance in peak intensities over the wavelength range of approximately 612 nm to approximately 552 nm.

It is to be understood that the present invention is not limited to the embodiments described above, but encompasses any and all embodiments within the scope of the following claims.

We claim:

1. A temperature tuned conjugated polymer laser, comprising:
    a pump laser for generating an initial light beam defining a path;
    a lens disposed in the path of the initial light beam for focusing the initial light beam into an excitation light beam;
    a thiophene-based conjugated polymer;
    an optical cell containing the thiophene-based conjugated polymer, the optical cell having an inlet port and an outlet port, the optical cell being positioned so that the excitation light beam is directed towards the optical cell to cause the thiophene-based conjugated polymer to lase;
    means for circulating the thiophene-based conjugated polymer through the an inlet port and the outlet port of the optical cell;
    an optical cavity spaced apart from the optical cell for intensifying stimulated radiation emitted from the thiophene-based conjugated polymer, the optical cavity having a fully-reflective mirror and a partially-reflective mirror, the partially-reflective mirror being configured for emitting an output light beam; and
    means for selectively and controllably adjusting the temperature of the thiophene-based conjugated polymer to tune the of the output light beam wavelength.

2. The temperature tuned conjugated polymer laser as recited in claim 1, wherein the thiophene-based conjugated polymer comprises a solution of poly[3-(2-ethyl-isocyanato-octadecanyl)-thiophene] dissolved in tetrahydrofuran.

3. The temperature tuned conjugated polymer laser as recited in claim 2, wherein the solution has a concentration of poly[3-(2-ethyl-isocyanato-octadecanyl)-thiophene] between 0.25 mol/m³ and 4.0 mol/m³.

4. The temperature tuned conjugated polymer laser as recited in claim 3, wherein the wavelength of the output light beam is tunable between 552 nm and 612 nm over a temperature range of the thiophene-based conjugated polymer between 60° C. and 10° C.

5. The temperature tuned conjugated polymer laser as recited in claim 4, wherein the initial light beam has a wavelength of 355 nm.

\* \* \* \* \*